United States Patent [19]

Moczall

[11] 3,756,286
[45] Sept. 4, 1973

[54] DEVICE FOR BLOCKING A CONDUIT

[75] Inventor: Kurt Moczall, Erlangen, Germany

[73] Assignee: Siemens Aktiengellschaft, Berlin, Germany

[22] Filed: Feb. 12, 1971

[21] Appl. No.: 114,962

[30] Foreign Application Priority Data
Feb. 13, 1970 Germany.................. P 20 065 559.2

[52] U.S. Cl................................. 138/94.3, 138/94
[51] Int. Cl............................................. F16l 55/10
[58] Field of Search....................... 138/89, 94, 94.3; 217/78, 79; 220/24.5

[56] References Cited
UNITED STATES PATENTS
| | | | |
|---|---|---|---|
| 1,705,666 | 3/1929 | Gentry | 138/94 |
| 293,677 | 2/1884 | Schimper | 217/79 |
| 569,040 | 10/1896 | Eichhorn | 138/89 UX |
| 1,628,686 | 5/1927 | Raible | 217/79 X |
| 3,442,294 | 5/1969 | Bischoff et al. | 138/94 X |

Primary Examiner—Herbert F. Ross
Attorney—Curt M. Avery, Arthur E. Wilfond, Herbert L. Lerner and Daniel J. Tick

[57] ABSTRACT

A device for blocking a conduit has two sealing discs disposed in a plane transverse to the longitudinal axis of the conduit. A support bolt conical in shape is wedged between the discs in this plane for positively sealing the discs against the inner surface of the wall of the conduit.

5 Claims, 3 Drawing Figures

DEVICE FOR BLOCKING A CONDUIT

My invention relates to a device for blocking a conduit. The blocking device of my invention is especially suitable for blocking the conduit of the cooling system in tne nuclear reactor.

With conduit it is often required that repairs of components of the conduit system must be undertaken without completely removing the working medium from the conduit. It is especially true in the circulation systems of nuclear reactors which carry the cooling medium. The conduits of such circulation systems must remain filled with cooling medium in the region of the reactor in order to insure an eventual and certain after-cooling.

To block these conduits for a limited time at different occasions, it is known to provide an inflatable bag in the conduit which is made of tight and elastic material. In this way the blocked portion of the conduit can be drained while the remaining portion of the conduit remains filled with cooling medium.

Blocking a conduit with this type of an inflatable bag has, however, various disadvantages. Specifically, such an inflatable bag can only withstand a limited pressure. In addition, the inner surface of the conduit wall must exhibit certain characteristics so that the bag one inflated, exerts a force against such surface sufficient to achieve positive sealing. Furthermore, the aforementioned inflatable bags have a limited useful life and require replacement after being employed but a few times.

Accordingly, it is an object of my invention to provide a device for blocking a conduit which can be introduced into the conduit in a simple manner and can provide positive sealing or blocking of the conduit in the presence of high pressure differentials. It is another object of my invention to provide a device for blocking a conduit which can be used without the need for frequent replacement.

According to a feature of the invention two sealing discs are disposed in a plane transverse to the longitudinal axis of the conduit. Also, a support bolt is wedged between the discs in this plane for pressing the discs against the inner surface of the wall of the conduit.

The sealing discs are introduced into the conduit via a passage defined by a structure extending from the conduit. As a supporting bolt is inserted into the passage defined by the structure, the discs are forced away from each other and are urged to press tightly against the inner surface of the conduit wall. The supporting bolt is seated in the structure in seal tight relation thereto as such bolt is inserted into the conduit.

The conduit is formed with a groove at the inner surface of the conduit wall. The sealing discs are preferably segment shaped and dimensioned to accommodate the contour of this inner surface, as well as, the conduit whose inner surface is substantially circular in cross-section. The groove of the inner wall surface is adapted to receive an arcuate edge of the segment shaped disc. In addition, each of the disc has a disc groove which extends around the entire periphery thereof for accommodating a sealing strip.

To provide for better sealing action as between the sealing discs and the inner surface of the conduit wall, the supporting bolt is conically shaped, has two slots in its conical surface positioned 180° from each other, and extends in a plane longitudinal to the axis of the bolt. The segment shaped discs each have a chord edge joining the ends of the arcuate edge. The chord edges of the segment shaped discs are received by the aforementioned slots respectively.

The blocking device according to the invention saves considerable space, is less expensive and is easier to use than the blocking bags used previously. In addition, a weakening of the conduit caused by introducing the structure needed to properly position the blocking device is minimized since a smaller structure is required with instant invention. Since the blocking device of the instant invention is made of metallic materials, it is readily possible to check the physical properties of the components used for constructing device and therefore properly design such devices for use at substantially higher pressure differentials than heretofore possible.

The blocking device itself imposes no requirements whatsoever on the characteristics of the conduit surface since the device is received in a sealing groove formed in a small region of the inner surface of the conduit wall.

The invention will now be described with reference to the drawings wherein.

Figure 1:
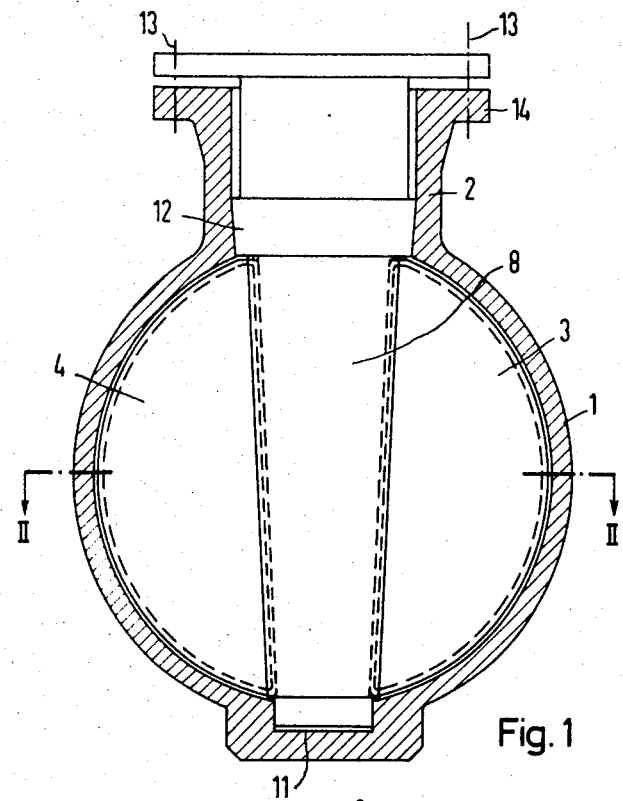
FIG. 1 illustrates partially in section, a conduit equipped with a blocking device according to the invention.
Figure 2:
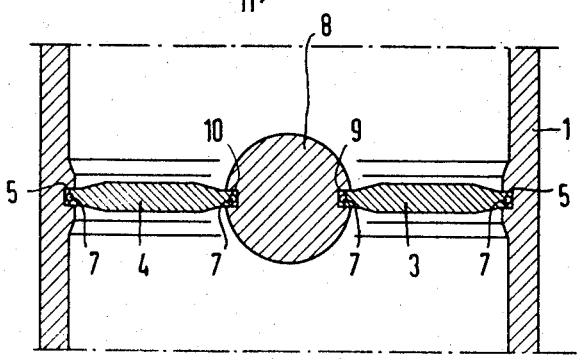
FIG. 2 is a section of the conduit and blocking device taken at line II—II of FIG. 1.

The conduit 1 is formed with a laterally extending structure 2 through which the components of a blocking device can be inserted into the conduit 1. The blocking device has two sealing discs 3 and 4 which are dimensioned so as to correspond to the contour of the inner surface of the conduit wall. The discs 3 and 4 are shaped in the form of segments of a circular area. Each disc is bounded by an arcuate edge joined at its ends by a chord edge. The segment-shaped discs 3 and 4 are received by a groove 5 formed in the inner surface of the conduit wall. The segment-shaped discs each have a disc groove extending around the entire periphery thereof in which is inserted a sealing strip 7, the latter being made for example from a profile band of soft material. The support bolt 8 is conically dimensioned in the region of the sealing discs 3 and 4. The bolt 8 has two slots located in its conical surface spaced 180° from each other and extending along the longitudinal axis of the bolt. These slots receive discs 3 and 4 respectively at the chord edges of the latter.

To block the conduit 1, sealing discs 3 and 4 are first inserted into the conduit 1 through a passage defined by structure 2 and positioned into groove 5. Then the supporting bolt 8 is inserted through structure 2 and is wedged between the sealing discs 3 and 4 so as to press the latter tight against the inner surface of the conduit wall. The supporting bolt 8 can be received by a recess 11 in the conduit wall located diametrically opposite the support structure 2. Instead of the recess 11 an inwardly projecting journal can be provided at the same location to receive the supporting bolt 8. The bolt 8 self seals against the structure 2 at a conical sealing surface 12 of the bolt 8 and can be secured via screws 13 to flange 14 of structure 2. Thus, the structure 2 and the supporting bolts 8 define an interface where the former seals against the latter when the bolt is inserted into the conduit.

Figure 3:
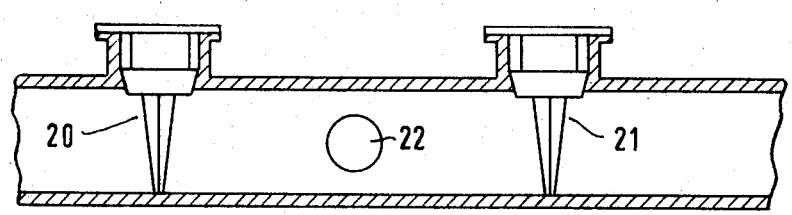
FIG. 3 illustrates a combination of two of the devices according to FIGS. 1 and 2.

With the device according to the invention, it is possible in a simple manner to safely block individual conduit sections at high pressures. If necessary, it is also possible to arrange a combination of the blocking devices of FIG. 1, as illustrated in FIG. 3 where two blocking devices 20 and 21 are arranged in tandem. The conduit portion between the two blocking devices is provided with an outlet 22 for removing the cooling medium in the blocked conduit portion.

While the invention has been described by means of specific examples in a specific embodiment, I do not wish to be limited thereto for obvious modifications will occur to those skilled in the art without departing from the spirit and the scope of the invention.

I claim:

1. A sealing device for use in a nuclear reactor cooling system having a conduit with a wall having an inner surface having a groove formed therein, comprising in combination, two disc-shaped sealing members, each comprising a circular segment disposed in a plane transverse to the axis of the inner wall surface of said conduit, each circular segment being bounded by an arcuate edge joined at its ends by a chord edge and having a groove extending around the entire periphery thereof; a sealing strip in the groove around each circular segment; conically shaped support bolt means positioned between the disc-shaped sealing members and adapted to cooperatively coact therewith, said bolt means being movable to urge said sealing members against the inner surface of said conduit wall, the sealing members including outer edges adapted to seat in the groove formed in the inner surface of the wall of the conduit; and two oppositely positioned grooves in the bolt means for positively receiving said sealing members at the chord edges of the latter.

2. A sealing device as claimed in claim 1, further comprising structural means integral with said conduit and opening thereinto for introducing the sealing members and said bolt means into the interior of said conduit, said sealing strip positively sealing abutting surfaces of said bolt means and said structural means.

3. A sealing device as claimed in claim 1, wherein said sealing members and said bolt means are disposed in tandem pairs to thereby form a blocked conduit portion; and further comprising outlet means formed in the conduit and positioned between said tandem pairs adapted to purge said conduit portion of its contents.

4. A sealing device according to claim 1, wherein said bolt means is conically shaped and said conduit is of substantially circular cross-section.

5. A sealing device according to claim 1, wherein said bolt means is provided with two slots 180° from each other and extending in a plane containing the longitudinal axis of said bolt means the chord edges of the sealing members being received in said slots respectively.

* * * * *